US007089988B2

(12) United States Patent
Coleman

(10) Patent No.: US 7,089,988 B2
(45) Date of Patent: Aug. 15, 2006

(54) WINDOW BLINDS OPENING AND CLOSING DEVICE

(76) Inventor: David Harold Coleman, 5608 Zoram Ct., Sacramento, CA (US) 95841

( * ) Notice: Subject to any disclaimer, the term of this patent is extended or adjusted under 35 U.S.C. 154(b) by 258 days.

(21) Appl. No.: 10/838,777

(22) Filed: May 3, 2004

(65) Prior Publication Data

US 2005/0241780 A1 Nov. 3, 2005

(51) Int. Cl.
*E06B 9/30* (2006.01)
*F16H 1/14* (2006.01)

(52) U.S. Cl. ....................... 160/168.1 R; 160/176.1 R; 160/176.1 P; 74/417; 74/625

(58) Field of Classification Search ................ 160/107, 160/168.1 P, 168.1 R, 176.1 R, 176.1 P, 160/173 R, 177 R, 168.1 V, 173 V, 176.1 V, 160/DIG. 17; 74/625, 417, 423, 421 A
See application file for complete search history.

(56) References Cited

U.S. PATENT DOCUMENTS 4,456,049 A * 6/1984 Vecchiarelli ......... 160/176.1 R
6,086,133 A * 7/2000 Alonso ...................... 296/97.8

* cited by examiner

*Primary Examiner*—Hugh B. Thompson, II
*Assistant Examiner*—Candace L. Bradford
(74) *Attorney, Agent, or Firm*—Risto A. Rinne, Jr.

(57) ABSTRACT

An apparatus for opening and closing window blinds converts rotary motion about a vertical axis of a vertical rod into rotary motion about a horizontal axis of a horizontal member. A lever is attached to one end of the horizontal member. A drive gear is attached to an opposite end of the horizontal member. A driven gear is attached to a first end of a vertical member. The driven gear is operatively engaged with the drive gear. The vertical member is perpendicular with respect to the horizontal member. An adapter housing is attached to an opposite end of the driven gear and is used to attach a bottom end of the vertical rod thereto. All component parts are supported by a base member that is attached to a wall. Turning the lever rotates the drive gear which rotates the vertical rod and, accordingly, opens or closes the blinds.

14 Claims, 2 Drawing Sheets

WINDOW BLINDS OPENING AND CLOSING DEVICE

BACKGROUND OF THE INVENTION

1. Field of the Invention

The present invention, in general relates to window blinds and, more particularly, to a device for opening and closing mini-blinds.

Mini-blinds, sometimes also known as Venetian blinds, include a plurality of spaced-apart parallel horizontal slats that are supported by a common carrier that includes a common support carriage disposed near each side of the blinds.

A support structure is disposed above the common support carrier. The support structure includes means for raising and lowering all of the slats, as desired, and also means for retaining the slats at a desired position other than all the way up proximate the support structure or all the way down maximally away from the support structure.

The support structure also includes a mechanism for varying the tilt angle of all of the slats simultaneously by affecting the common support carrier that supports all of the slats. A rod extends down vertically, usually from one side of the support structure, and is rotated in one direction to open the slats (i.e., to dispose them so that their plane, or chord, is substantially level with respect to the plane of the earth) or to close the slats (i.e., to dispose them so that their plane is at an angle that is nearly vertical with respect to the plane of the earth).

Sufficient rotation of the vertical rod in either direction will eventually dispose the slats at either a first angle (where a first edge of each of slats is disposed above an opposite second edge) or at a second angle (where the first edge of each of slats is disposed below the opposite second edge).

It is not possible, generally, for all of the slats to be disposed at a truly vertical angle with respect to the earth because the top of one slat will contact the bottom of a slat that is above it. This is because the slats include a slight overlap in the vertical position. A slight offset away from vertical is common in the fully closed positions, there being two such positions (the first angle and the second angle as previously described).

The slats for certain types of blinds are flat planar members while for the most common types of mini-blinds, they each generally include an arcuate member that is slightly curved across a relatively narrow width and which extends along a considerably longer longitudinal length. When the plane of the slats is mentioned herein, it is either the plane extending through a center of the flat planar members (slats) or a chord extending across the slightly curved width of the arcuate slats and extending along the longitudinal length thereof, that is being referred to.

A first problem encountered is that the rod hangs down adjacent to the blinds. The user, wishing to open or close the blinds, must contort the hand and wrist in order to rotate the rod about its vertical axis. This is not a natural position for the hand and is therefore difficult to accomplish.

It is especially difficult to attain a circular motion for the hand sufficient to rotate the rod about its vertical axis once it is contorted in a position necessary to grasp the rod. Only a small arc rotation is possible in this position, necessitating many small repetitive hand motions in order to open or close the blinds.

A second problem is that many turns of the rod must occur in order to fully open or close the blinds. This takes time to accomplish. Furthermore, the awkward attitude of the hand, as mentioned above, further aggravates and extends this process.

The term "open" refers to orienting either the planar slats or the chord of the slightly arcuate slats parallel to the plane of the earth, thereby permitting light to enter the room when the blinds are in a lowered position.

It is also generally necessary or recommended by the manufacturer of the blinds that they be placed in the "open" position prior to a raising or lowering of the blinds.

The terms "close" or "closed" refers to orienting the planar slats or the chord of the arcuate slats at an angle as far from parallel to the plane of the earth as is possible for the slats, or stated another way as nearly vertical as is possible, thereby substantially preventing light from entering into the room.

The blinds are not typically closed when they are fully raised. They are usually in at least a partially lowered position whenever they are disposed in a fully closed position. The blinds may be either partially lowered or fully lowered to a bottom of a window sill when they are opened and closed.

There are also many other positions (i.e., angles) possible for the slats other than parallel to the earth (i.e., open) or nearly vertical (i.e., closed). As the angle of the slats relative to the plane of the earth is varied, a proportional blocking of light entering into the room occurs.

A third problem is that curtains, drapes, or other types of window treatments are often used along with blinds. Any window treatment usually covers a portion of the window, most commonly, along the sides where the rod is disposed. This makes is difficult even to find, let alone access the rod, for opening or closing purposes.

With certain curtains, there is only a small space intermediate the blinds and the curtains, thereby making it extremely difficult to access the rod for opening or closing of the slats.

An especially troublesome fourth problem is that when a person opens or closes the blinds (i.e., the slats) that are disposed behind curtains or drapes, the attempt to reach the rod forces the person to brush against the window treatment (i.e., the curtains or drapes). This soils the curtains or drapes in the area near the rod which, in turn, necessitates frequent removal and expensive cleaning of the window treatments.

Accordingly, there exists today a need for a window blinds opening and closing device that helps ameliorate the above-mentioned difficulties.

2. Description of Prior Art

Blinds are, in general, known. While the structural arrangements of the above described devices may, at first appearance, have similarities with the present invention, they differ in material respects. These differences, which will be described in more detail hereinafter, are essential for the effective use of the invention and which admit of the advantages that are not available with the prior devices.

OBJECTS AND SUMMARY OF THE INVENTION

It is an object of the present invention to provide a window blinds opening and closing device that is adapted to assist in the closing of a window blind.

It is also an important object of the invention to provide a window blinds opening and closing device that is adapted for use with existing types of window blinds.

Another object of the invention is to provide a window blinds opening and closing device that is adapted for use with existing types of window blinds which include a vertical rod.

Still another object of the invention is to provide a window blinds opening and closing device that is adapted to attach to a vertical rod.

Still yet another object of the invention is to provide a window blinds opening and closing device that converts rotation about a vertical axis, necessary to open or close the blinds, into rotation about a horizontal axis.

Yet another important object of the invention is to provide a window blinds opening and closing device that includes a lever that is adapted to rotate at least a portion of a circle about a horizontal axis and means for converting the rotation along the horizontal axis into rotation about a vertical axis.

Still yet another important object of the invention is to provide a window blinds opening and closing device that includes a lever that is adapted to rotate at least a portion of a circle about a horizontal axis and means for converting the rotation along the horizontal axis into rotation about a vertical axis and wherein the blinds include a vertical rod and wherein the device is adapted to attach to the vertical rod sufficient to rotate the rod about its vertical axis when the lever is rotated about its horizontal axis.

A first continuing object of the invention is to provide a window blinds opening and closing device that includes a lever that is adapted to rotate at least a portion of a circle about a horizontal axis and means for converting the rotation along the horizontal axis into rotation about a vertical axis and wherein the blinds include a vertical rod and wherein the device is adapted to attach to the vertical rod sufficient to rotate the rod when the lever is rotated and wherein the means for converting includes a change in gear ratio sufficient so that the rod rotates at a greater amount in degrees of arc-rotation about its vertical axis than the lever rotates about its horizontal axis.

A second continuing object of the invention is to provide a window blinds opening and closing device that includes a lever that is adapted to rotate at least a portion of a circle about a horizontal axis and means for converting the rotation along the horizontal axis into rotation about a vertical axis and wherein the blinds include a vertical rod and wherein the device is adapted to attach to the vertical rod sufficient to rotate the rod when the lever is rotated and wherein the means for converting includes a change in gear ratio sufficient so that when the lever rotates at amount less than 360 degrees about its horizontal axis, the rod rotates about its vertical axis an amount that is sufficient to either open or close the blinds.

Briefly, a window blinds opening and closing device that is constructed in accordance with the principles of the present invention has a base member that is adapted to attach to a wall proximate a vertical rod for opening or closing blinds. A vertical member is provided that includes a center vertical axis. The vertical member is adapted to attach to the rod at one end thereof and is attached to a driven gear at an opposite end thereof. The vertical member is attached to the base member and is adapted to rotate about the center vertical axis thereof. A horizontal member that includes a center horizontal axis is attached to a drive gear at one end thereof. The drive gear is operatively engaged with the driven gear. A lever is attached to an opposite end of the horizontal member than the drive gear is attached. The horizontal member is attached to the base member and is adapted to pivot about the center horizontal axis thereof. Preferably, the drive gear contains more teeth than the driven gear. Therefore, a small rotation by the lever about the center horizontal axis causes the driven gear, and also the rod, to rotate a substantial amount about the center vertical axis. The horizontal member extends away from a window opening, making it both quick and easy to open or close the blinds.

DETAILED DESCRIPTION OF THE INVENTION

Figure 1:
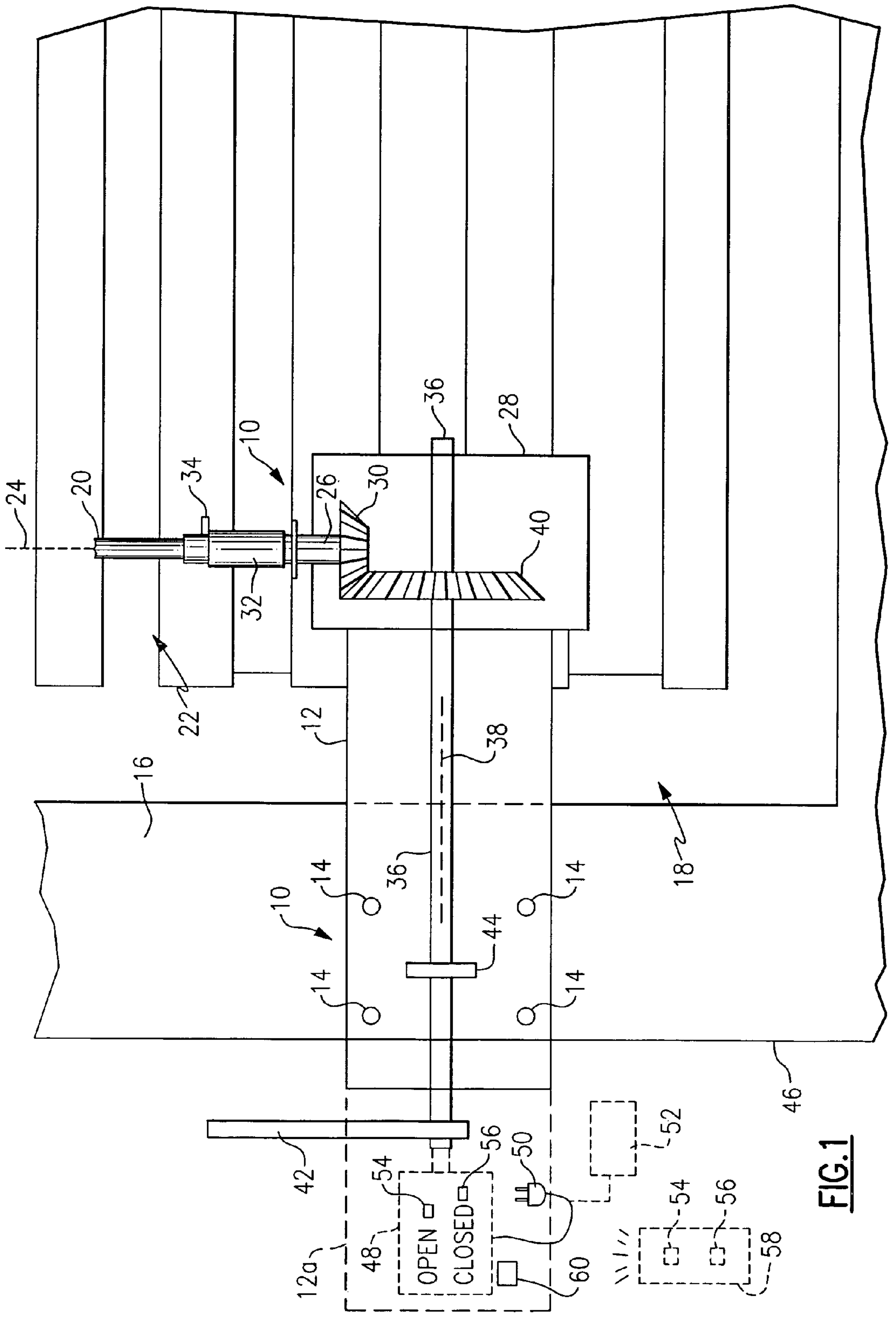
FIG. 1 is a top, cross-sectional view of a window blinds opening and closing device.

Referring to FIG. 1 is shown, a window blinds opening and closing device, identified in general by the reference numeral 10.

A base member 12 is substantially planar and includes mounting holes 14 for attaching the base member to a wall 16. Screws (not shown) pass through the mounting holes 14 and secure the base member 12 to the wall 16.

A window opening, identified in general by the reference numeral 18, is adjacent to the wall 16. The window opening is an area that includes a window (not shown).

A vertical rod 20 (only a portion thereof is shown) hangs down from a top-mounted support structure (now shown). The support structure is used to control (i.e., to raise, lower, open, close) a plurality of slats, identified in general by the reference numeral 22. The slats 22 are shown in a substantially closed position with each slat 22 nearly vertical. The slats 22 themselves are sometimes also referred to as "window blinds".

The base member 12 is secured to the wall 16 proximate the vertical rod 20. The vertical rod 20 is rotated about a center longitudinal vertical axis 24 to either open or close the slats 22.

A vertical member 26 is attached to a gear housing assembly 28. The gear housing assembly 28 is attached to the base member 12 at an end thereof that is disposed in the window opening 18 area, under the vertical rod 20.

The vertical member 26 includes a center vertical axis that, when the vertical rod 20 and the vertical member 26 are properly attached together, is in alignment with the center longitudinal vertical axis 24 of the vertical rod 20.

The vertical member 26 is supported by the gear housing assembly 28 and is allowed to rotate about the center vertical axis.

A lower end of the vertical member 26 is attached to a driven gear 30. An adapter housing 32 is attached to an upper end of the vertical member 26 at an opposite end thereof.

The adapter housing 32 includes an opening at an upper end thereof into which a lower portion of the vertical rod 20 is inserted. The adapter housing 32 includes a shape that matches that of the vertical rod 20. Often the vertical rod 20 includes a hexagonal or polygonal shape. The upper end of the adapter housing 32 is adapted to receive a portion of the bottom end of the vertical rod 20.

If desired, a friction fit may be utilized to secure the bottom end of the vertical rod 20 in the adapter housing 32. If desired, a set screw 34 may be used to retain the vertical rod 20 therein.

It is generally preferred to attach the base member 12 to the wall 16 at a location where the vertical rod 20 aligns with and extends sufficiently far into the adapter housing 32. If preferred, the base member 12 may be installed at any elevation that is below the support structure and in-between the bottom end of the vertical rod 20, as desired.

This is useful if, for example, the window blinds opening and closing device 10 is to be installed a somewhat higher elevation, for example high enough to clear the back of a sofa or other piece of furniture (not shown) that is disposed against the window opening 18. If this is the case, the base member 12 of the window blinds opening and closing device 10 is installed at any elevation desired taking care to ensure that the center vertical axis of the vertical member 26 aligns with the center longitudinal vertical axis 24 of the hanging vertical rod 20. Any excess in the length of the vertical rod 20 is removed by cutting the rod 20 and the bottom portion thereof is inserted into the adapter housing 32.

A horizontal member 36 that includes a center horizontal axis 38 is attached to a drive gear 40 at one end thereof. The drive gear 40 is operatively engaged with the driven gear 30. The horizontal member 36 is supported at one end thereof by the gear housing assembly 28 proximate the drive gear 40 and is allowed to rotate about the center horizontal axis 38.

The center horizontal axis 38 is preferably perpendicular with respect to the center vertical axis of the vertical member 26 although, if desired, angles other than perpendicular may be utilized. The horizontal member 36 is typically disposed a desired distance away from and parallel with the surface of the wall 16. If desired, it may be at an angle with respect to the surface of the wall 16.

A lever 42 is attached to an opposite end of the horizontal member 36 where the drive gear 40 is attached. A bearing support member 44 is attached to the base member 12 proximate the lever 42 and is adapted to support the opposite end of the horizontal member 36. The lever 42 functions as a crank to turn the horizontal member 36 an amount that is desired.

Preferably, the drive gear 40 contains more gear teeth than the driven gear 30. The ratio is a design variable. For certain types of blinds (i.e., slats 22) about seven full turns of the vertical rod 20 are required in order to fully open or close the blinds. Accordingly, if the drive gear 40 contains seven times the number of gear teeth than the driven gear 30, then only one revolution of the drive gear 40 (i.e., one turn of the lever 42) is all that is required to fully open or close the blinds. Therefore, a small rotation by the lever 42 about the center horizontal axis 38 causes the driven gear 30, and also the rod 20, to rotate a substantial amount (several full turns) about the center longitudinal vertical axis 24. The horizontal member 36 extends away from the window opening 18, making it both quick and easy to open or close the blinds.

If the drive gear 40, according to this example, had fourteen times the teeth of the driven gear 30, then only one-half rotation of the lever 42 (i.e., about 180 degrees of arc-rotation) is required to fully open or close the blinds. Whenever possible, this ratio is generally preferred.

Of course, during assembly, the vertical rod 20 is attached to the adapted housing 32 when the lever 42 is in first disposed in the desired position and the blinds are first properly oriented. For example, an "up" lever 42 position, as shown, may be employed when the blinds are fully open.

To accomplish this particular calibration (other initial settings are also possible, as desired), the lever 42 is first moved into the fully up position and the blinds are then fully opened by manually rotating the vertical rod 20.

The vertical rod 20 is then inserted into and secured in the adapter housing 32, thereby providing the desired calibration. Merely rotating the lever 42 from the "up" position as shown into a full "down" position (not shown) that is 180 degrees of arc rotation away is sufficient to close the blinds. Rotating the lever 42 back into the up position would once again fully open the blinds. Positioning the lever 42 anywhere in-between the full up or full down position would proportionately open (or close) the blinds, as desired.

Use of the window blinds opening and closing device 10 provides many benefits, including rapid opening and closing of the slats 22, including the ability to position the slats 22 anywhere between full open and closed quickly and with certainty. This makes it easier to adjust the slats 22 to changing light conditions as the sun moves across the sky.

The gear ratio also allows for motion of the lever 42 about the center horizontal axis that is less than 180 degrees of arc-rotation resulting in several rotations of the vertical rod 20, thereby opening or closing the blinds (i.e., the slats 22) with incredible speed and ease.

The gear ratio can be changed as desired to accommodate any particular need. For example, where less common but very heavy or difficult to open or close types of slats 22 are used, this may require another gear ratio.

It is even possible to put more teeth on the driven gear 30 than on the drive gear 40, thereby using the window blinds opening and closing device 10 to provide a mechanical advantage (i.e., less force required) to open or close the slats 22. If the lever 42 must be rotated more than 180 degrees, the horizontal member 36 is disposed sufficiently far away from the wall 16 to prevent the lever 42 from making contact with the wall 16 as it is rotated. Of course, if desired, a shorter lever 42 can be used.

As the lever 42 is disposed away from a set of hanging curtains 46, the curtains 46 do not become soiled when opening or closing the slats 22.

Another unexpected benefit provided by the window blinds opening and closing device 10 is that it holds the bottom end of the vertical rod 20 secure and in proper alignment with the support structure during the entire opening and closing cycle (i.e., for several rotations of the vertical rod 20). This prevents the vertical rod 20 from shifting out of position, for example, from skewing off to one side or of twisting at the top, where it attaches to the support structure. Not only does shifting or skewing of the vertical rod 20 make it harder to rotate the vertical rod 20, but it is possible to damage the mechanism where it attaches to the support structure.

The window blinds opening and closing device 10 therefore always ensures that minimum (i.e., less than usual) force is required to open or close the slats 22 and it also prevents damage to the support structure from occurring, thereby extending the useful life of the blinds.

If the blinds are to be removed from the wall 16, the vertical rod 20 is removed from the adapter housing 34 and the blinds are removed in a conventional manner, opposite to how they are attached to the wall 16. Therefore, use of the window blinds opening and closing device 10 does not substantially impede removal of the blinds, when required.

It is also desirable with more custom installations or when the window opening 18 is difficult to access, for example, if it is overhead and covers a skylight, to eliminate the lever 42 and substitute a motor 48 (shown in dashed lines) in its place, attaching a motor drive shaft to the horizontal member 36. When the motor 48 is included the base member 12 includes an enlarged base section **12*a* (shown in dashed lines). The motor 48 is attached to the enlarged base section 12*a***.

The motor 48 preferably is an AC type and it includes a power cord 50 for connection to a duplex receptacle (not shown) providing an alternating current and voltage source, for example, 120 VAC. The power cord 50 could alternatively be wired into a conventional type of an electrical box.

If preferred, batteries 52 could be used to power a DC type of the motor. The batteries 52 would be in a holder that is either attached to the base member 12 or the enlarged base section 12*a* or they are located at a remote, easy to access location, as is required whenever fresh batteries 52 are required.

The motor 48 (or elsewhere on the base member 12 or the enlarged base section 12*a*) includes an "open" momentary first electrical switch 54 and a "close" momentary second electrical switch 56, each of which control the direction of rotation of the motor 48 and therefore can be used to open or close the slats 22 to the extent desired. Either the first or second switch 54, 56 is released whenever desired to cease opening or closing of the slats 22 and retain them in the desired position.

The first and second electrical switches 54, 56 can, of course, be replaced with a single "toggle" type of momentary switch to accomplish the same functionality.

It is most preferred to include a remote control device 58 that is in cooperative engagement with a receiver circuit 60 that is attached to the motor 48. The remote control device 58 would similarly include the first and second electrical switches 54, 56, thereby allowing remote control of the position of the slats 22.

The motor 48 can include any desired gear reduction, either built inside its own housing or as an external add-on component (not shown) to vary the torque that is applied to the horizontal member 36 and also to control the speed at which it is rotated, thereby making it easier to precisely set the blinds (i.e., the angle of the slats 22) where desired.

It is noted also that the horizontal member 36 extends through both sides of the gear housing assembly 28, as desired, to provide extra support for the horizontal member 36 (i.e., another bearing surface) proximate the drive gear 40. The portion of the horizontal member 36 that extends beyond the drive gear 40 (i.e., to the right of the drive gear 40, as shown) could, if desired, be eliminated if sufficient bearing support was otherwise provided.

Figure 2:
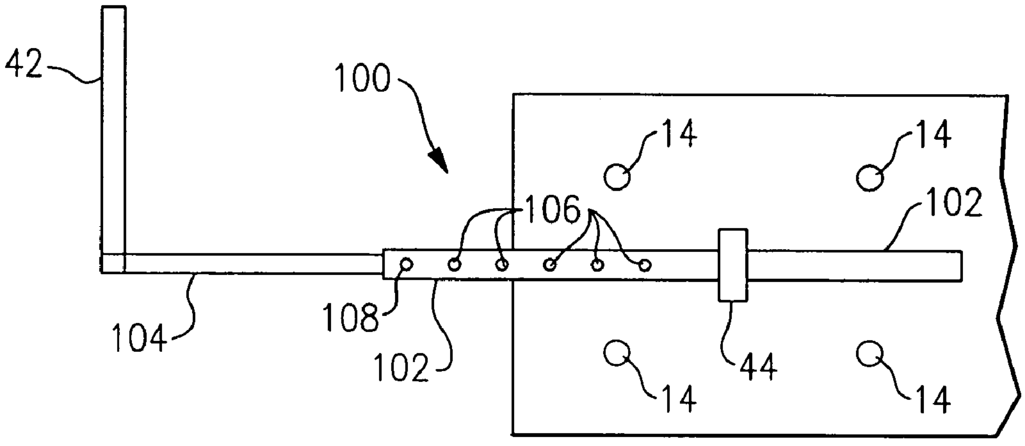
FIG. 2 is a top view of a modified telescoping horizontal member of FIG. 1.

Referring now to FIG. 2 is shown a modified telescoping horizontal member, identified in general by the reference numeral 100.

Depending upon the type of window treatment used, the curtains 46 can include a wide variety of differences in the amount of overlap from the window opening 18 area. Therefore, the distance that the lever 42 needs to be away from the window opening 18 is a variable. Accordingly, the telescoping horizontal member 100 is able to extend or retract the lever 42 with respect to the window opening 18 so that the lever 42 is just beyond the curtains 46.

The telescoping horizontal member 100 includes a first member 102 that is attached to the drive gear 40 and secured to the base member 12. A first end of a second member 104 is adapted to extend in or out of the first member 102 to provide the telescoping action. The lever 42 is attached an opposite second end of the second member 104.

The first member 102 can include a method for retaining the second member 104 at a fixed location away from it, if desired. One possible way is to include a plurality of spaced apart holes 106 in a portion of the first member 102.

A spring loaded detent 108 is provided in the second member 104. The detent 108 is depressed (by pushing a tip of a pen [not shown] in one of the holes 106 sufficient to depress the detent 108. The second member 104 is then urged either further into or out of the first member 102, as desired.

When the detent 108 aligns with another of the holes 106, the detent then extends outward and into the newly located hole 106, thereby securing the second member 104 at a new location with respect to the first member 102 and, accordingly, providing a variable telescopic overall length to the telescoping horizontal member 100.

It is of course necessary that when the second member 104 is rotated about its longitudinal center axis (by turning the lever 42), that the first member 102 also similarly rotate in proportion. There are many ways to accomplish this.

For example, a hollow longitudinal opening of a preferred shape that prevents the second member 104 from rotating inside of the first member 102 is preferred. The first member 102 could include a circular exterior and a square interior into which the second member 104 can fit. If the second member 104 also had a square shape, only slightly smaller, it would fit in the first member 102, be adapted to extend or retract within the first member 102, and able to transfer a rotary moment to the first member 102.

It is also possible, as another example, to include a longitudinal recess in the first member 102 and a correspondingly shaped protrusion in the second member 104 so that the protrusion fits into the longitudinal recess and can extend along a longitudinal length thereof, yet still transfer rotary force to the first member 102 by the protrusion bearing against the walls of the longitudinal recess.

The invention has been shown, described, and illustrated in substantial detail with reference to the presently preferred embodiment. It will be understood by those skilled in this art that other and further changes and modifications may be made without departing from the spirit and scope of the invention which is defined by the claims appended hereto.

What is claimed is:

1. A window blinds opening and closing device adapted for use with a window blind that includes a vertical rod for opening and closing the window blinds, comprising:

(a) a base member adapted to be attached to a wall proximate a window opening;

(b) a horizontal member adapted to rotate about a longitudinal axis thereof including means for supporting said horizontal member a predetermined distance away from said base member;

(c) a vertical member adapted to rotate about a vertical axis thereof, said vertical member disposed at a ninety degree angle with respect to said horizontal member and including means for supporting said vertical member a predetermined distance away from said base member;

(d) means for converting rotary motion about said longitudinal axis of said horizontal member into rotary motion about said longitudinal axis of said vertical member; and means for attaching said vertical member to said vertical rod.

2. The window blinds opening and closing device of claim 1 wherein said means for converting rotary motion about said longitudinal axis of said horizontal member into rotary motion about said longitudinal axis of said vertical member includes a drive gear attached to one end of said horizontal member and a driven gear attached to an end of said vertical member that is disposed maximally away from said vertical rod, and wherein said driven gear is in cooperative engagement with said drive gear.

3. The window blinds opening and closing device of claim 2 wherein said drive gear includes a greater number of gear teeth than said driven gear.

4. The window blinds opening and closing device of claim 2 wherein said horizontal member includes a lever attached at an opposite end thereof than said drive gear is attached.

5. The window blinds opening and closing device of claim 2 wherein said horizontal member includes a motor attached at an opposite end thereof that said drive gear is attached.

6. The window blinds opening and closing device of claim 5 including a source of electrical power for said motor.

7. The window blinds opening and closing device of claim 6 wherein said source of electrical power includes a source of alternating current and voltage.

8. The window blinds opening and closing device of claim 6 wherein said source of electrical power includes a source of direct current and voltage.

9. The window blinds opening and closing device of claim 5 including means for controlling said motor from a remote location.

10. The window blinds opening and closing device of claim 1 including means for varying an overall length of said horizontal member.

11. The window blinds opening and closing device of claim 10 wherein said horizontal member includes a first member and a second member and wherein said second member is adapted to retract toward said first member sufficient to reduce said overall length or to extend away from said first member sufficient to increase said overall length.

12. The window blinds opening and closing device of claim 10 wherein said means for varying an overall length of said horizontal member includes an apparatus for retaining said overall length of said horizontal member at a predetermined overall length.

13. The window blinds opening and closing device of claim 1 wherein said means adapted for attaching said vertical member to a vertical rod includes an adapter housing attached to an upper end of said vertical member and wherein a portion of said vertical rod is adapted to enter into an opening provided in said adapter housing.

14. The window blinds opening and closing device of claim 13 wherein said adapter housing includes means for securing said vertical rod thereto.

* * * * *